June 3, 1930. C. F. CARPENTER ET AL 1,761,772
TIME ELEMENT ELECTRORESPONSIVE DEVICE AND SYSTEM EMPLOYING THE SAME
Filed Oct. 20, 1925

Inventors:
Charles F. Carpenter,
Donald I. Bohn,
by
Their Attorney.

Patented June 3, 1930

1,761,772

UNITED STATES PATENT OFFICE

CHARLES F. CARPENTER, OF SCHENECTADY, NEW YORK, AND DONALD I. BOHN, OF BADIN, NORTH CAROLINA, ASSIGNORS TO GENERAL ELECTRIC COMPANY, A CORPORATION OF NEW YORK

TIME-ELEMENT ELECTRORESPONSIVE DEVICE AND SYSTEM EMPLOYING THE SAME

Application filed October 20, 1925. Serial No. 63,794.

The improvements provided by our present invention enable electro-responsive devices such as switches, relays, or the like, to respond to predetermined electrical conditions a time interval after the occurrence thereof.

In one of its aspects the invention provides an improved arrangement of controlling apparatus and circuits whereby an electro-responsive switch may be operated at will under the control of suitable master switch mechanism to open and close a controlled circuit and also operated automatically to open the controlled circuit a time interval after the occurrence of predetermined electrical conditions, such as undervoltage or failure of power.

The invention also provides an improved form of combined thermal and electro-magnetic electro-responsive controlling device which operates instantaneously upon a predetermined energization thereof and responds with a time delay to a reduction in the energization of the device. When energized responsively to the voltage of the controlled circuit and arranged in accordance with our invention, the improved time element controlling device cooperates with the master switch mechanism in controlling the energizing circuit of an electro-responsive line switch or contactor so as to afford time element undervoltage protection to a motor or other electrical apparatus.

A better understanding of the invention may be had by reference to the accompanying drawings which illustrate a time element circuit controlling device embodying a preferred form of the invention and adapted to control the circuit of an alternating current electric motor, although it should be understood that the invention is not necessarily restricted to alternating current service.

Figure 1:
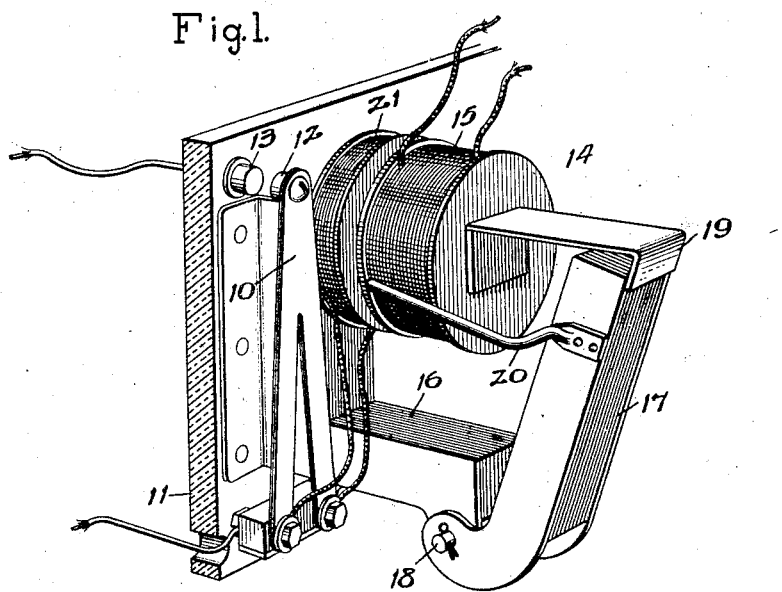
Figure 2:
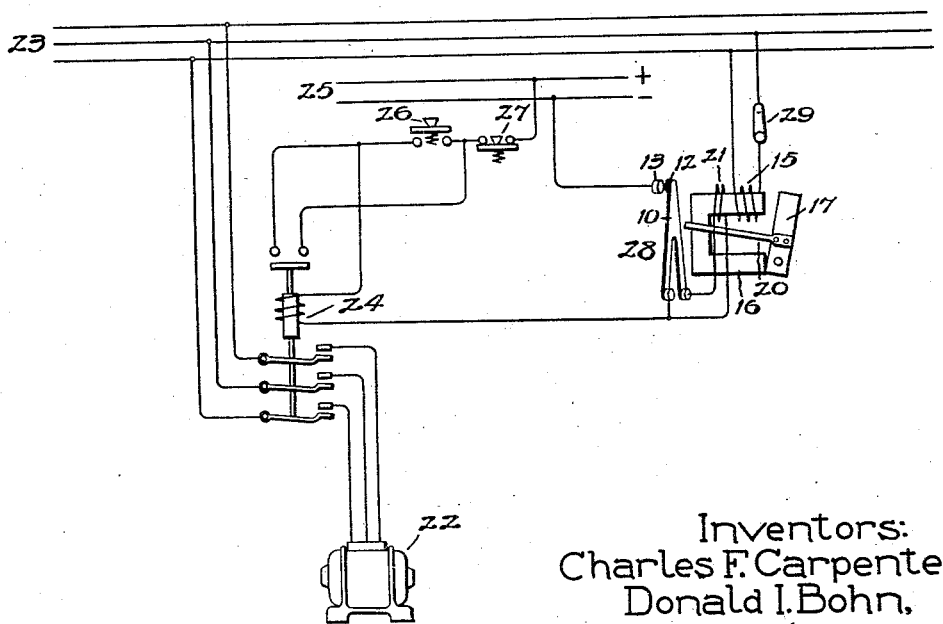

Fig. 1 is a perspective view of our improved time element electro-responsive device arranged for alternating current service, and Fig. 2 is a circuit diagram showing an alternating current motor control system arranged to provide automatic time element undervoltage protection in accordance with the invention and embodying the form of time element controlling device illustrated in Fig. 1.

As shown in Fig. 1, the electro-responsive controlling device is arranged to close a controlled circuit substantially instantaneously upon the energization of the device and to maintain the controlled circuit closed for a time interval after a reduction in the energization of the device, although it will be obvious to those skilled in the art that the device may be readily modified to the time element circuit closing type if desired.

The time delay in the operation of the device is obtained by means of the thermal element 10 which is of the bimetallic type and is suitably secured at one end to an insulating base or support 11 and carries at its free end the movable contact 12 which cooperates with the stationary contact 13 to open and close the circuit controlled by the device. At ambient temperatures, the thermal element is biased to maintain the contacts 12 and 13 disengaged.

In order to close the controlled circuit substantially instantaneously upon energization of the electro-responsive device, the electro-magnet 14 comprising the operating winding 15 and magnetic structure 16 and having the movable armature 17, is arranged to mechanically move the thermal element 10 into the circuit closing position upon energization of the operating winding 15. It will be seen that the armature 17 is pivotally mounted upon the pin 18 so as to be biased into the position in which it is held by the stop 19 as shown in Fig. 1. The operating arm 20, which is carried by the armature 17, is arranged to engage with the free end of thermal element 10 when the armature 17 is moved to the attracted position, thereby mechanically moving the thermal element 10 so as to engage the contact 12 with the stationary contact 13.

The thermal element 10 is arranged to be heated whenever the operating winding 15 of the electromagnet is energized. When applied to alternating current service this may be accomplished by arranging the auxiliary winding 21 in inductive relation with the operating winding 15 of the electromagnet and connecting the winding 21 so as to supply heating current directly to the thermal element 10. As shown, the thermal element 10 is formed in the shape of a V and is of such internal resistance as to be heated readily by the relatively large current supplied from the auxiliary winding 21. Obviously the thermal element 10 may be heated in other ways in either alternating current or direct current services, if desired, as by means of suitable heated coils.

From the foregoing it will be evident that when the winding 15 is energized with a suitable alternating current, the armature 17 is attracted and carries the operating arm 20 into engagement with the thermal element 10 to move the contact 12 into engagement with the contact 13. As the energization of winding 15 continues the thermal element 10 is heated by the current induced in the auxiliary winding 21. After a predetermined time interval the temperature of the thermal element 10 reaches the value required to cause the element 10 to flex sufficiently to maintain the contact 12 in engagement with the contact 13 independently of the armature 17. Hence, if the energization of winding 15 is reduced sufficiently to permit the armature 17 to return to the biased position, the thermal element 10 maintains the contact 12 in engagement with the stationary contact 13 for the time interval required for the thermal element to cool.

In case the winding 15 is reenergized before the thermal element 10 is cooled it will be evident that the circuit controlled by the contacts 12 and 13 is maintained closed during the period of deenergization of the winding 15. If, however, the element 10 is cooled sufficiently to disengage the contact 12 from the contact 13, the circuit controlled thereby is opened and is reclosed upon the reenergization of winding 15 in the manner previously described.

The time element electro-responsive device shown in Fig. 1 is particularly adapted for use in an automatic undervoltage motor protective system such as shown in Fig. 2. In this system the circuit through which the three phase alternating current motor 22 receives power from suitable lines 23 is controlled by an electro-responsive switch 24 which is biased to the open position as shown. The operating winding of switch 24 is energized from separate supply lines such as the direct current supply lines 25 under the control of the motor starting push button 26 and motor stopping push button 27, although the switch 24 may be energized directly from the main supply lines 23 if desired, also other forms of master switch mechanism may be provided for establishing and interrupting the energizing circuit of the line contactor 24 if desired.

The electro-responsive time element circuit controlling device 28 is shown as of the type illustrated in Fig. 1 and is arranged to be energized responsively to the voltage of the supply lines 23. The circuit controlling contacts 12 and 13 are connected so as to cooperate with the push buttons 26 and 27 in controlling the energizing circuit of the line contactor 24. The arrangement is such that when the contact 12 carried at the free end of thermal element 10 is in engagement with the contact 13, the energization and deenergization of the operating winding of line switch 24 is under the control respectively of the starting push button 26 and the stopping push button 27. When the line contactor 24 is closed to establish the running connections for the motor 22 and the voltage of the supply lines 23 is decreased for any reason below the value at which operation of the motor 22 may be continued safely, the time element device 28 is designed to automatically interrupt the energizing circuit of the line contactor 24 after a desired time interval to thereby disconnect the motor 22 from the supply lines 23.

With the arrangement of the automatic undervoltage protective device as shown, the operating winding 15 is energized at all times in accordance with the voltage of the supply lines 23 when the controlled switch 29 is closed. Consequently, when the voltage of the supply lines is at a suitable operating value the armature 17 is maintained in the attracted position and the thermal element 10 is mechanically operated to and held in the circuit closing position. At the same time, the thermal element 10 is heated by the current induced in the auxiliary winding 21. Under these conditions closure of the starting push button 26 establishes an energizing circuit for the line contactor 24 extending from the upper supply line 25 through the stop push button 27, the starting push button 26, the operating winding of line contactor 24, the thermal element 10, contacts 12 and 13, thence to the lower supply line 25. Upon the resulting closure of the line contactor, the motor 22 is connected for operation from the supply lines 23 and a holding circuit in shunt with the starting push button 26 is closed by the auxiliary contact 29 with which the line contactor 24 is provided. Thus, the contactor 24 is maintained energized independently of the starting push button 26 and the interruption of the energizing circuit of the contactor is under the control of either the stop push button or the automatic time element electro-responsive device 28.

The heated thermal element 10 of the device 28 functions to maintain the energizing circuit of contactor 24 closed for a time interval after the occurrence of undervoltage conditions or failure of power. This is due to the fact that the thermal element 10 maintains the contact 12 in engagement with the contact 13 for a time interval after the armature 17 is released when the undervoltage condition or failure of power occurs. Thus in case the undervoltage or failure of power is only temporary, the energizing circuit of line switch 24 is maintained closed until the return of normal voltage conditions. If the undervoltage or failure of power persists for an extended interval, the thermal element 10 then is permitted to cool sufficiently to separate the contacts 12 and 13 and interrupt the energizing circuit of the line contactor. When the line contactor 24 is energized from a separate source as shown, the motor 22 remains connected to the supply lines 23 during the temporary undervoltage condition. When, on the other hand, the line contactor 24 is energized directly from the supply lines 23, the undervoltage may be sufficient to cause the contactor 24 to drop open. However, upon the return of normal voltage before the thermal element 10 cools the contactor 24 is immediately reclosed to reconnect the motor 22 to supply line 23. Upon the return of normal voltage conditions the thermal responsive element 10 is substantially instantaneously operated to the circuit closing position upon the attraction of armature 17, but the motor 22 is not connected to the supply lines 23 until after operation of the start push button 26 as previously described.

While we have described the invention in connection with an alternating current system, it will be evident that the invention may be applied with equal advantage to afford automatic undervoltage protection to direct current circuits.

What we claim as new and desire to secure by Letters Patent of the United States is:—

1. A time element circuit controlling device including a movable switch member, electro-responsive means for moving the member from one circuit controlling position to a second circuit controlling position, and thermal responsive means arranged to be heated under the control of said electro-responsive means for returning the switch member to said first position after a time interval determined by the cooling of said thermal responsive means.

2. A time element circuit controlling device including a movable switch member biased to one circuit controlling position, electro-responsive means for moving the member to a second circuit controlling position, and thermal responsive means arranged to be heated in accordance with the energization of said electroresponsive means for maintaining the switch member in said second position for a time interval while the thermal responsive means cools after a predetermined reduction in the energization of said electro-responsive means.

3. A time element electro-responsive circuit controlling device including cooperating switch contacts biased out of engagement, a movable thermal element for maintaining the contacts in engagement when the element is heated, electro-responsive means for moving the said contacts into engagement upon a predetermined energization of said means, and means for heating said element in accordance with the energization of said electroresponsive means to maintain the said contacts in engagement during the cooling of the thermal element after a reduction in the energization of said electro-responsive means.

4. A time element electro-responsive circuit controlling device including a movable switch element, a movable thermal responsive element mechanically connected to control the movement of said switch element from a predetermined position, and electro-responsive means connected to be energized responsively to an electrical characteristic for mechanically moving the said switch element to said predetermined position when the said electrical characteristic is above a predetermined value and for heating the thermal responsive element to cause the same to retain the switch element in said position for a time interval after the said electrical characteristic decreases below said value.

5. A time element electro-responsive current controlling device including a movable thermal element, a movable circuit controlling contact controlled thereby, means for heating the element in accordance with a variable electrical characteristic to cause the element to move the contact with a time delay from a predetermined circuit controlling position upon the cooling of the thermal element due to variation in the said characteristic below a predetermined value, and electro-responsive means energized responsively to said characteristic for substantially instantaneously operating the said movable contact to said position when the electrical characteristic is increased to said predetermined value.

6. An electro-responsive time element circuit controlling device including a movable thermal responsive circuit controlling element heated in accordance with an electrical characteristic and having a contact mounted thereupon and adapted to assume a predetermined circuit controlling position when said characteristic is at a predetermined value, electro-responsive means energized responsively to said variable electrical characteristic and having a movable member for substantially instantaneously operating the said movable element to move the contact to said position upon an increase of said variable electrical characteristic to said predetermined value, said movable member being arranged to move to an inactive position upon a reduction in the value of said electrical characteristic to permit the thermal responsive element to retain the contact in said circuit controlling position for a time interval during the cooling of the thermal element after the reduction in the value of said electrical characteristic.

7. A time element electro-responsive circuit controlling device including a thermal responsive circuit controlling element having a contact mounted therefrom, means for heating the element in accordance with an electrical characteristic to cause the same to move the contact with a time delay action from one circuit controlling position to a second circuit controlling position when the said electrical characteristic is reduced below a predetermined value, electro-responsive means energized in accordance with the value of said electrical characteristic and having a movable member biased to an inactive position and arranged to substantially instantaneously move said thermal element to carry said contact to the said first position when the electrical characteristic is at said predetermined value and return to said inactive position upon a reduction in the value of the electrical characteristic to permit the movable thermal element to maintain the contact in said first circuit controlling position a time interval thereafter during the cooling of the thermal element.

8. A time element circuit controlling device including a thermal responsive circuit controlling element operable into engagement with a cooperating contact, an electro-magnet having a movable magnetic member mechanically connected to move the thermal element into engagement with the cooperating contact upon a predetermined energization of the electro-magnet, and means inductively associated with the electro-magnet for heating the thermal element in accordance with the energization thereof to maintain the element in engagement with the cooperating contact for a time interval after a reduction in the energization of the electro-magnet.

9. A time element undervoltage relay including a movable thermal responsive circuit controlling element biased out of engagement with a cooperating contact when the thermal element is at normal temperature, an electro-magnet having a movable magnetic member for mechanically operating the thermal circuit controlling element into engagement with the cooperating contact upon energization of the electro-magnet above a predetermined voltage, and a winding disposed in inductive relation with the operating winding of the electro-magnet and arranged to heat the thermal responsive element to cause the same to remain in engagement with the cooperating contact for a time interval after the reduction in the energizing voltage of the electro-magnet.

10. A time element under-voltage circuit protective system including an electroresponsive switch for controlling the circuit, said switch being biased for operation to the circuit-interrupting position, master switch mechanism for controlling the energizing connections of said switch to close and open the circuit at will, and automatic electroresponsive time element means connected to be eneregized in accordance with the voltage of the circuit and having normally open circuit-controlling means electrically operated to the closed position and connected to cooperate with said master switch to establish energizing connections for said electroresponsive switch when the voltage of the circuit is above a predetermined value and operable with a time delay independently of said master switch mechanism to interrupt the energizing connections of the electroresponsive switch an interval after a reduction in the voltage of the circuit below a predetermined value.

11. A time element under-voltage circuit protective system including an electroresponsive switch for controlling the circuit, said switch being biased to the circuit-interrupting position, a normally open control switch operable to the closed position to establish a circuit for energizing the said electroresponsive switch for operation thereof to the closed position, and automatic time element electroresponsive means energized in accordance with the voltage of the controlled circuit and having circuit controlling means biased to the open position and electrically operated to the closed position to maintain the energizing circuit of the said electroresponsive switch established independently of said normally open switch under normal voltage conditions and operable with a time delay to interrupt the said independent energizing circuit of the electroresponsive switch an interval after the occurrence of under-voltage conditions of the circuit.

12. A time element under-voltage circuit protective system including a circuit-controlling switch biased to the open position, electroresponsive means for operating the switch to the closed position and maintaining the same therein, a normally open master switch connected to establish a circuit for energizing said electroresponsive means upon operation of the master switch to the closed position, a second electroresponsive means connected to be energized in accordance with the voltage of the circuit controlled by said first switch, normally open circuit-controlling means operated by said second means to the closed position and electrically connected to maintain the energizing circuit of said first electroresponsive means established independently of said normally open switch, and time delay means for preventing operation of said circuit controlling means from the closed position for a time interval after a reduction in the voltage of the circuit controlled by said first switch below a predetermined value.

13. A time element under-voltage circuit protective system including an electroresponsive circuit-controlling switch biased to the circuit-interrupting position, a normally open switch for connecting said electroresponsive switch to be energized for operation to the circuit-closing position, an electroresponsive circuit-controlling device biased to the circuit-opening position and connected to be energized in accordance with the voltage of the circuit controlled by the first switch for operation to the closed position, time delay means associated with said device to be rendered effective upon operation thereof to the closed position for delaying operation thereof in accordance with its bias, and connections jointly controlled by said device and said electroresponsive switch through which the said electroresponsive switch is maintained energized independently of the normally open switch for a time interval after a predetermined reduction in the voltage of the circuit controlled by the electroresponsive switch.

In witness whereof CHARLES F. CARPENTER has hereunto set his hand this 10th day of October, 1925, and DONALD I. BOHN has hereunto set his hand this 12th day of October, 1925.

CHARLES F. CARPENTER.
DONALD I. BOHN.